(12) United States Patent
Gomez et al.

(10) Patent No.: US 7,213,261 B1
(45) Date of Patent: May 1, 2007

(54) INTERACTIVE VIRTUAL LIBRARY SYSTEM FOR EXPEDITIOUSLY PROVIDING USER-DESIRED INFORMATION FROM CONTENT PROVIDERS, AT LEAST ONE OF WHICH IS COMMERCIAL, TO A USER WITHOUT THE NEED FOR THE USER TO ACCESS THE CONTENT PROVIDERS INDIVIDUALLY

(75) Inventors: Alirio I. Gomez, East Meadow, NY (US); Christopher E. Chalsen, Briarcliff Manor, NY (US); Maria G. Doulos, Massapequa, NY (US); Paula M. Prudenti, Patchogue, NY (US)

(73) Assignee: Milbank, Tweed, Hadley & McCloy LLP, New York, NY (US)

( * ) Notice: Subject to any disclaimer, the term of this patent is extended or adjusted under 35 U.S.C. 154(b) by 1285 days.

(21) Appl. No.: 09/695,175

(22) Filed: Oct. 24, 2000

Related U.S. Application Data

(63) Continuation-in-part of application No. 09/415,578, filed on Oct. 8, 1999, now Pat. No. 6,938,168.

(51) Int. Cl.
*G06F 17/30* (2006.01)
(52) U.S. Cl. ............................. 726/7; 726/19; 726/21
(58) Field of Classification Search ........ 713/200–202, 713/150–154; 705/35; 707/6–10; 726/1–34
See application file for complete search history.

(56) References Cited

U.S. PATENT DOCUMENTS 5,933,811 A     8/1999  Angles et al.

(Continued)

OTHER PUBLICATIONS http://www.libraryjournal.com/index.asp?layout=articlePrint&articleID=CA200892.*

(Continued)

*Primary Examiner*—David Jung

(57) ABSTRACT

The present invention provides an interactive library system having a computer in telecommunication link with at least one user computer and computer of at least one content provider requiring payment for information access. The interactive library system performs the following: Receiving, by the library system computer, user identification and password from the user computer. Comparing, by the library system computer, the received user identification and password with authorized user identifications and corresponding passwords stored in the library system to determine whether to grant access to the interactive library system. If the comparison results in grant of access, then the interactive library system provides one or both of the following: (1) Receiving, by the library system computer, input from the user computer specifying type of information desired by the user. Establishing, by the library system computer, telecommunication link with the content provider computer. Transmitting, by the library system computer, the type of information desired by the user as search request to the content provider computer. Receiving, by the library system computer, result of the search request from the content provider computer. And providing, by the library system computer, the result to the user computer. (2) Setting, by the library system computer, the user's privileges. If the user's privileges correspond to a first preselected level of access, then providing, by the library system computer, access to information in a Deal Room. And if the user's privileges correspond to a second preselected level of access, then providing, by the library system computer, right to modify Deal Room information and/or upload electronic files to the Deal Room.

24 Claims, 6 Drawing Sheets

U.S. PATENT DOCUMENTS 5,956,697 A      9/1999   Usui
6,067,531 A *   5/2000   Hoyt et al. .................... 705/35
6,263,330 B1     7/2001   Bessette
6,289,362 B1     9/2001   Van Der Meer

OTHER PUBLICATIONS http://www.webfeat.org/prism.html).*

(http://msdn.microsoft.com/library/default.asp?url=/library/en-us/dllproc/base/interactive_services.asp.*

Variations2: improving music findability in a digital library through work-centric metadata Notess, M.; Dunn, J.; Digital Libraries, 2004. Proceedings of the 2004 Joint ACM/IEEE Conference on Jun. 7-11, 2004 p. 422.*

Digital library access via image similarity search Heesch, D.; Pickering, M.J.; Howarth, P.; Yavlinsky, A.; Ruger, S.; Digital Libraries, 2004. Proceedings of the 2004 Joint ACM/IEEE Conference on Jun. 7-11, 2004 p. 412.*

Federating diverse collections of scientific literature Schatz, B.; Mischo, W.H.; Cole, T.W.; Hardin, J.B.; Bishop, A.P.; Hsinchun Chen; Computer vol. 29, Issue 5, May 1996 pp. 28-36.*

Gomez, Alirio, "Technology That Makes a Difference", Newsletter Center, Spring 2004.

Gordon, Stacey, "Update XVIII: What's New on LexisNexis, Westlaw, Loislaw and Versuslaw", Legal Information Alert, vol. 20, No. 10, Nov./Dec. 2001.

"From Sea to Shining Sea—Regional U.S. News Abounds on the Lexis-Nexis Services", Lexis-Nexis Information Professional Update, Issue 5, May 1999.

Gomez, Alirio, "Creating Your Own Intranet Page Workshop", West Group Information Center, Nov. 2-3, 1998.

"President's Notes", CFALL Notes, Feb. 1999 CFALL Newsletter.

"President's Notes", CFALL Notes, Nov. 1998.

MTHM Library Intranet History.

* cited by examiner

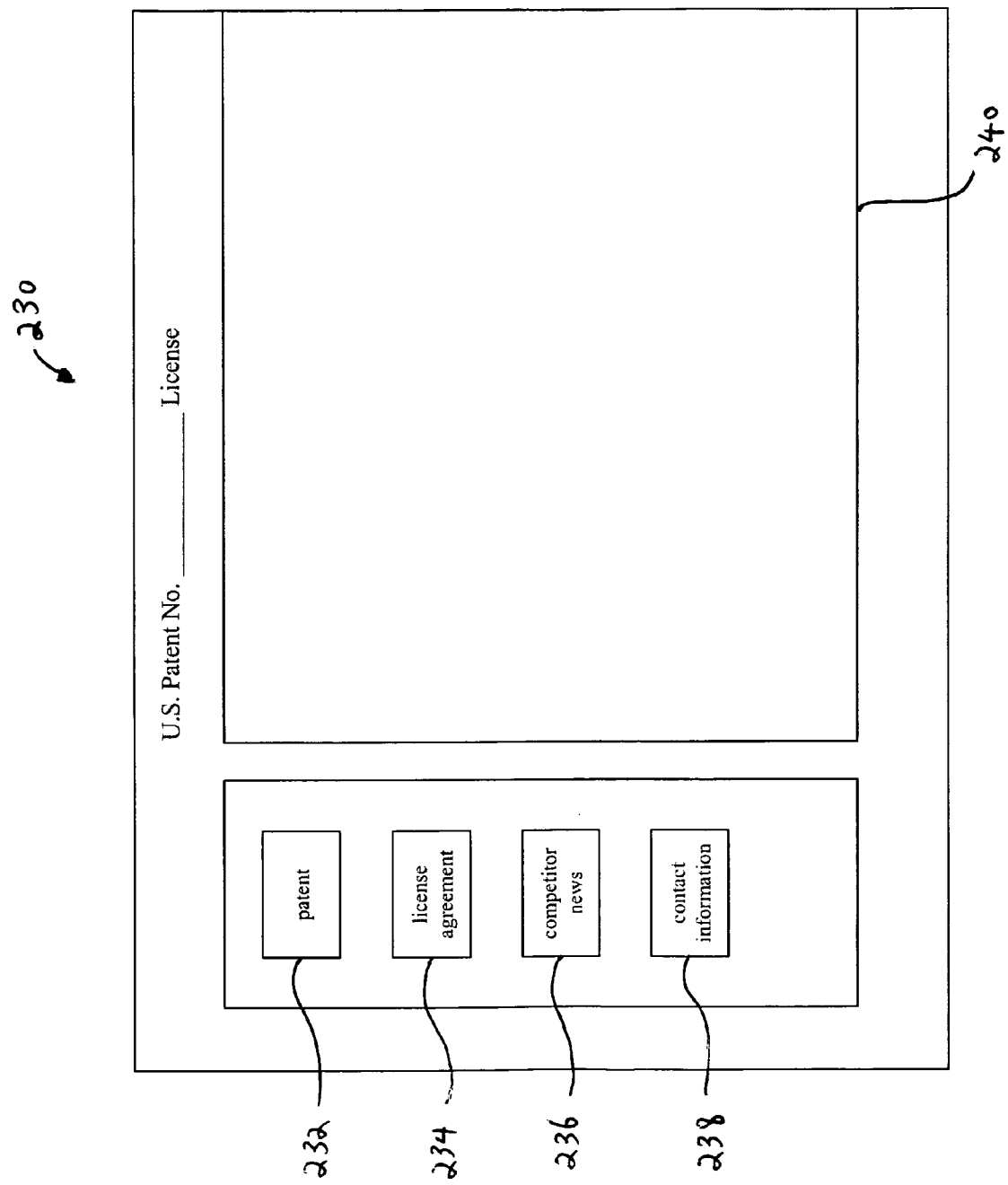

INTERACTIVE VIRTUAL LIBRARY SYSTEM FOR EXPEDITIOUSLY PROVIDING USER-DESIRED INFORMATION FROM CONTENT PROVIDERS, AT LEAST ONE OF WHICH IS COMMERCIAL, TO A USER WITHOUT THE NEED FOR THE USER TO ACCESS THE CONTENT PROVIDERS INDIVIDUALLY

RELATED APPLICATION

This application is a continuation-in-part of application Ser. No. 09/415,578 filed Oct. 8, 1999 now U.S. Pat. No. 6,938,168, which is incorporated herein by this reference.

BACKGROUND OF THE INVENTION

The present invention relates to an interactive virtual library system. More specifically, this invention relates to an interactive virtual library system for expeditiously: (1) providing user-desired information from content providers, at least one of which is a commercial content provider, to a user without the need for the user to access the content providers individually; and (2) providing a customized user interface through which a user with appropriate security privilege can access relevant electronic files and providing a user with appropriate security privilege the right to modify and/or upload electronic files.

Presently, a user of a personal computer ("PC") can access information from a content provider, such as Lexis®-Nexis® or WestLaw® or U.S. Securities and Exchange Commission world wide web site, by establishing a telecommunication link with the computer of the content provider and performing a search to obtain the information desired by the user. For example, the search may seek all relevant information in the databases accessible to the content provider pertaining to a specific company. Generally, the search results will be displayed on the user's monitor in numerical or chronological order.

While the conventional systems for accessing desired information from content providers are satisfactory, there are disadvantages presented by these systems. First, with existing systems, there is required much navigation (i.e., using an input device, such as a PC "mouse" or a keyboard, to go through various files and display pages) by the user to obtain the desired information from the various relevant databases. For example, with the conventional systems, a user has to establish a separate telecommunication link with each content provider to access that content provider's databases. With commercial content providers, i.e., content providers requiring payment for information access, the user generally has to enter at least authorized user identification and password in order to establish a telecommunication link. Then after establishing the telecommunication link, the user is required to navigate to obtain the desired information. This process becomes more and more cumbersome as the number of content providers accessed by the user increases.

Second, the existing systems do not provide for much, if any, customization of user interfaces. For example, there may be specific informational topics from Lexis®-Nexis® or another content provider for which a first user desires periodic information updates. If the first user is an employee of a company in charge of monitoring the activities of competitors, these topics may include financial news relating to each of the competitors, news relating to all lawsuits filed in the industry, and information pertaining to any patents, copyrights or trademarks obtained by the competitors. A second user, by contrast, may desire information updates from specific legal periodicals and technical journals. Despite the different informational topics desired by the first and second users, however, the user interface provided by a conventional system to both users is the same.

A third disadvantage of the conventional systems is illustrated by the following example. After the user has reviewed the desired information from a content provider, she may want to contact an appropriate person to discuss what she read. For example, if what she read relates to issuance of a patent to a competitor that effects her company's products, then she may want to contact the company's outside patent counsel for advice. With existing systems, there is no way for her to initiate contact with the outside patent counsel within the system. If she wants to use e-mail for this purpose, then she will have to go to the e-mail application and run it.

What is desired, therefore, is an interactive virtual library system that addresses the above-described disadvantages of existing systems. Furthermore, it is desired that such an interactive virtual library system provide a customized user interface through which a user with appropriate security privilege can access relevant electronic files (e.g., agreements in electronic form), and provide a user with appropriate security privilege the right to modify electronic files in the library system or upload electronic files to the library system.

It is axiomatic by now that the Internet has revolutionized how people work, live and play. To take an example, prior to the use of the Internet, lawyers or business people negotiating an agreement would mail or fax draft agreements back and forth until an agreement was finalized. Today, such draft agreements are often e-mailed back and forth until an agreement is finalized. While the use of e-mail to send documents back and forth results in significant time savings, it is not satisfactory in some cases.

For example, the lawyers or business people negotiating the agreement may also want up-to-date news information relating to the subject matter of the agreement. Also, there may be additional information or other documents that may need to be made accessible to the parties. Therefore, what is desired is an interactive virtual library system as described above, that also addresses these needs.

SUMMARY OF THE INVENTION

Accordingly, it is an object of the invention to provide a virtual library system that minimizes navigation by a user in obtaining desired information from various databases and from various content providers.

Another object of the invention is to provide a virtual library system that has a customizable user interface.

Still another object of the invention is to provide a virtual library system that expeditiously allows a user to contact a person specified by the user regarding the information obtained.

Yet another object of the invention is to provide a virtual library system having the above-described features adaptable for both intranet and extranet use.

Still another object of the invention is to provide a virtual library system that has a customizable user interface through which a user with appropriate security privilege can access relevant electronic files and modify and/or upload electronic files.

These and other objects are achieved by an interactive library system having a computer in telecommunication link with at least one user computer and computer of at least one content provider requiring payment for information access. The interactive library system performs the following:

(i) receiving, by the library system computer, user identification and password from the user computer;

(ii) comparing, by the library system computer, the received user identification and password with the authorized user identifications and corresponding passwords stored in the interactive library system to determine whether to grant access to the interactive library system;

(iii) if comparison results in grant of access, then the library system is capable of performing one or both of the following:

(iv) receiving, by the library system computer, input from the user computer specifying type of information desired by the user;

establishing, by the library system computer, telecommunication link with the content provider computer;

transmitting, by the library system computer, the type of information desired by the user as a search request to the content provider computer;

receiving, by the library system computer, result of the search request from the content provider computer; and providing, by the library system computer, the result to the user computer;

(v) setting, by the library system computer, the user's privileges;

if the user's privileges correspond to a first preselected level of access, then providing, by the library system computer, access to information in a Deal Room; and if the user's privileges correspond to a second preselected level of access, then providing, by the library system computer, right to modify Deal Room information and/or upload electronic files to the Deal Room.

BRIEF DESCRIPTION OF THE DRAWINGS

FIG. 6 shows another sample customized user interface provided by the interactive library system of FIG. 1.

DETAILED DESCRIPTION OF THE PREFERRED EMBODIMENT

Figure 1:
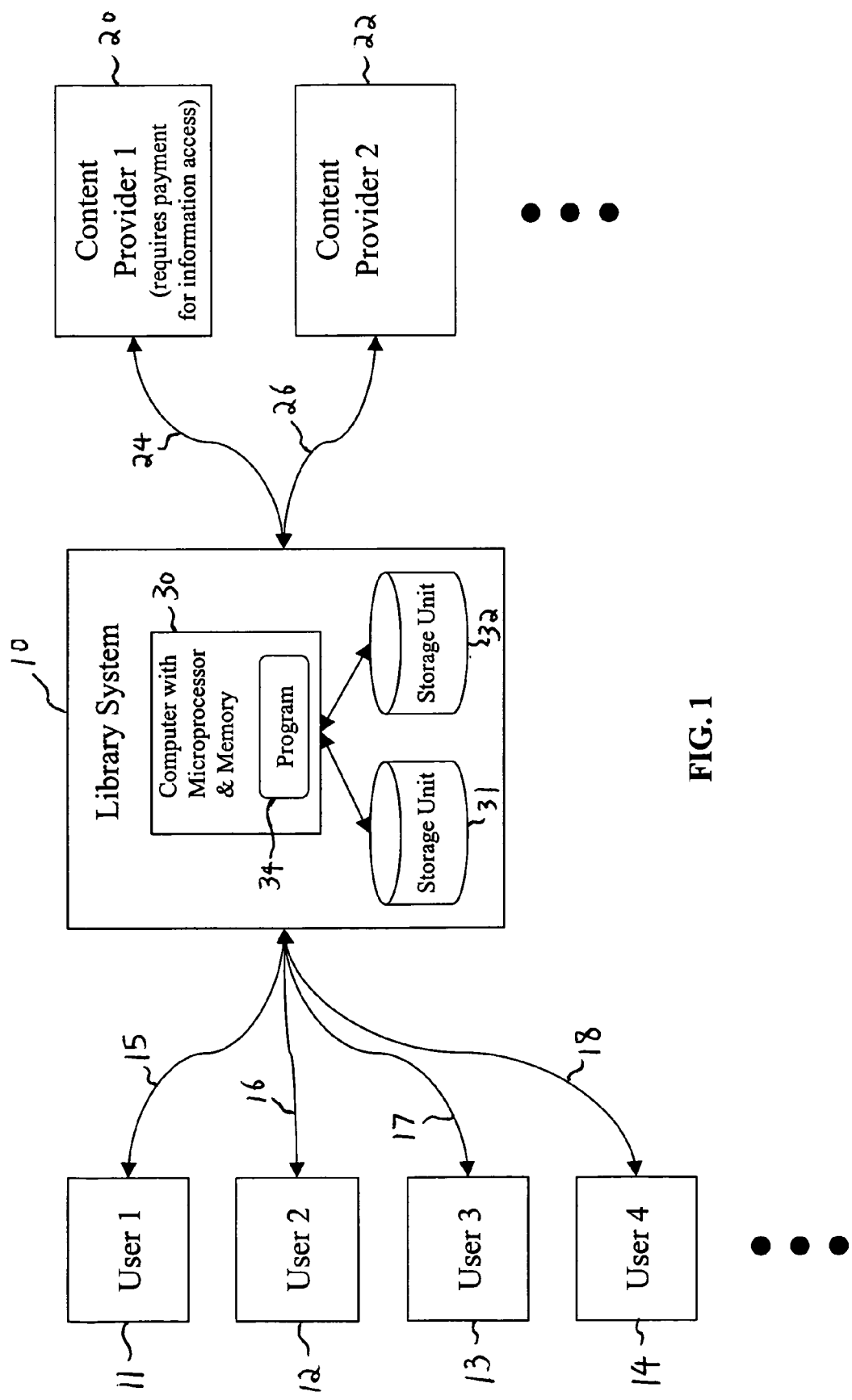
FIG. 1 shows an embodiment of an interactive library system of the present invention.

FIG. 1 shows an embodiment of an interactive library system 10 of the present invention in telecommunication link with user computers, four of which are shown as reference numerals 11–14, via telecommunication lines 15–18, respectively. The interactive library system 10 and one or more of the user computers 11–14 may be part of an intranet, i.e., internal company network, or an extranet, i.e., network where the library system 10 is accessible to outside third party users. As will be apparent to someone skilled in the art, the interactive library system 10 of the present invention is configured to work in both intranet and extranet system architectures.

The library system 10 is also in telecommunication link with computers of content providers, only two of which are shown by reference numerals 20, 22, via telecommunication lines 24, 26, respectively. At least one of the content providers is a commercial content provider, i.e. requiring payment for information access. The telecommunication links may be over a local area network ("LAN") or an Internet connection using a public switched phone network or a cable network. Connection may also be provided by dedicated data lines, cellular, Personal Communication Systems ("PCS"), microwave, satellite networks, or other means known in the art.

The library system 10 of FIG. 1 includes a computer 30 having a microprocessor and memory, and a first and second storage units 31, 32. The computer 30 is preferably a server. A program 34, which is preferably stored in memory of the computer 30, is operable on the microprocessor. The operation of the program 34 will be described in greater detail with respect to FIGS. 2, 3 and 5. As used herein, "program" may be source code having one or more subroutines or object code or the like. The first storage unit 31, which is preferably a database, stores data related to users, such as authorized user identifications and corresponding passwords, user account data, and type of information desired by the users. It should be noted that data related to users may be stored in more than one storage unit. The second storage unit 32, which is also preferably a database, stores data relating to the "Deal Rooms," as will be described in greater detail hereinbelow. Data relating to the Deal Rooms may be stored in more than one storage unit. In addition, the data in the first and second storage units 31, 32 may be stored in one storage unit, if desired. While FIG. 1 shows the storage units 31, 32 as part of the library system 10, it should be apparent to one skilled in the art that one or both of the storage units may be external to the library system of the present invention.

Figure 2:
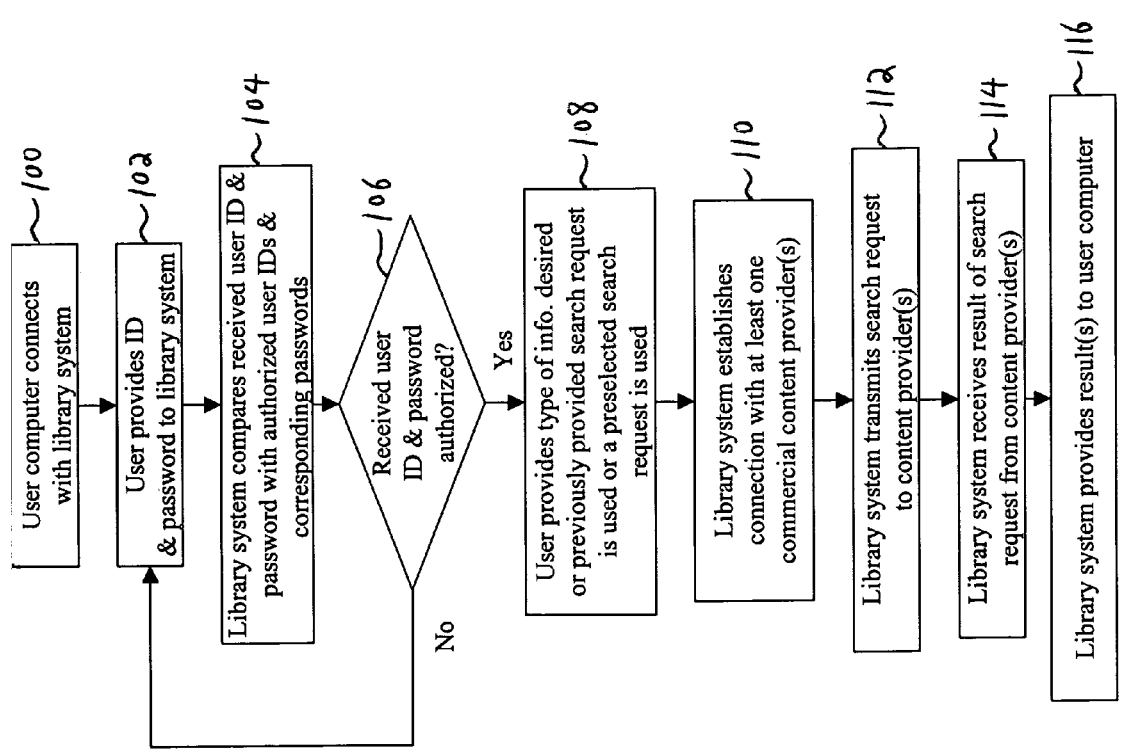
FIG. 2 shows a flowchart of one operation of the interactive library system of FIG. 1.

FIG. 2 is a flowchart of one operation of the interactive library system 10 of FIG. 1. At step 100, a user computer 11–14 establishes a telecommunication link with the library system 10. The user will then be prompted to provide a user identification and password (step 102). User ID and password may be input by the user through a keyboard, voice recognition system or other known input means, or the user ID and password may be stored in memory of the user computer 11–14 and provided to the library system 10. At step 104, the library system 10, preferably the microprocessor of the library computer 30, compares the received user ID and password with authorized user IDs and corresponding passwords stored in the first storage unit 31.

If the received user ID and password are found to be authorized, then the user is allowed access into the library system 10; otherwise, the user is prompted to provide another user ID and password (step 106). If access is allowed, then at step 108, the user may: (i) input type of information desired, e.g., financial news relating to companies in a specific industry; or (ii) choose to use a previously input search request, e.g., request for financial news relating to companies in a specific industry saved previously; or (iii) use a preselected search request, e.g., a selectable icon labeled "Internet-related Lawsuits" appearing on the user interface, the selection of which (such as by clicking with a PC "mouse") is a request for information relating to Internet-related lawsuits. As used herein, "search request" is to be construed broadly, to include any request for information, such as entering search terms, selecting an icon or a hyperlink, etc.

At step 110, the library system 10 establishes a telecommunication link(s) with relevant preselected content provider(s) based on the user's search request. In the preferred embodiment, at least one of the content providers is a commercial content provider. For example, if the request is for financial news relating to companies in a specific industry, the library system 10 may establish telecommunication links with preselected commercial content providers, such as Lexis®-Nexis® and WestLaw®, as well as preselected free content providers available on the Internet. Relevant content providers' information (e.g., Internet protocol address or web site domain name) is stored in either the memory of the library computer 30 or one of the storage units 31, 32 such that the program 34 may operate the microprocessor to access this stored information to enable the library system 10 to establish telecommunication links with the preselected content providers. Where necessary, such as for content providers which require user ID and password for access, the program 34 further operates the microprocessor of the library computer 30 to access such stored information from either the memory of the library computer 30 or one of the storage units 31, 32 to enable access to these content providers.

At step 112, the program 34 operates on the microprocessor of the library computer 30 to transmit the user's search request to the connected content provider(s). The result of the search request is received by the library system 10 from the content provider(s) at step 114. Finally, at step 116, the result is provided by the library system 10 to the corresponding user computer 11–14. While not shown in FIG. 2, it should be apparent to one skilled in the art that following step 116, the library system 10 may return to step 108 for additional search requests or the user may choose to logout or otherwise end access to the library system 10.

Figure 3:
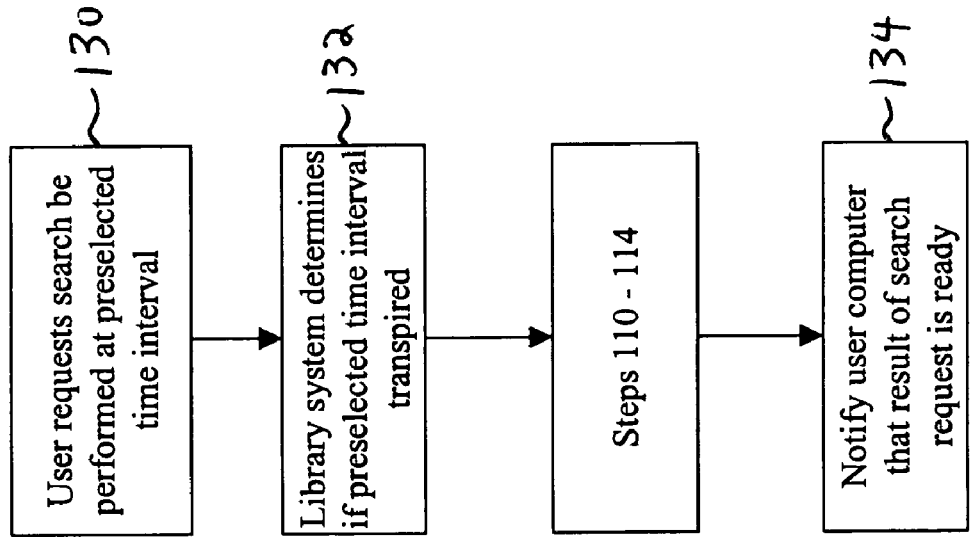
FIG. 3 is a flowchart showing additional functionalities providable to the interactive library system of FIG. 1.

FIG. 3 is a flowchart showing additional functionalities that may be provided to the interactive library system 10 of FIG. 1. In addition to the steps set forth in FIG. 2, the user is provided with the option of requesting the library system 10 to perform a search request at a preselected time interval (step 130). For example, the user may request that a search for financial news relating to companies in a specific industry be performed once a week. This preselected time interval chosen by the user is preferably stored in the first storage unit 31. Step 130 may follow step 108 of FIG. 2. At step 132, the library system determines whether the preselected time interval has transpired.

If the preselected time interval has transpired, then the library system 10 performs steps 110–114 of FIG. 2. Optionally, if requested by the user, the library system 10 may notify the user after receiving result of the search request from the content provider(s) that such results are ready for review by the user (step 134). Notification is preferably by electronic communication means, such as an appropriate e-mail message to the user.

Figure 4:
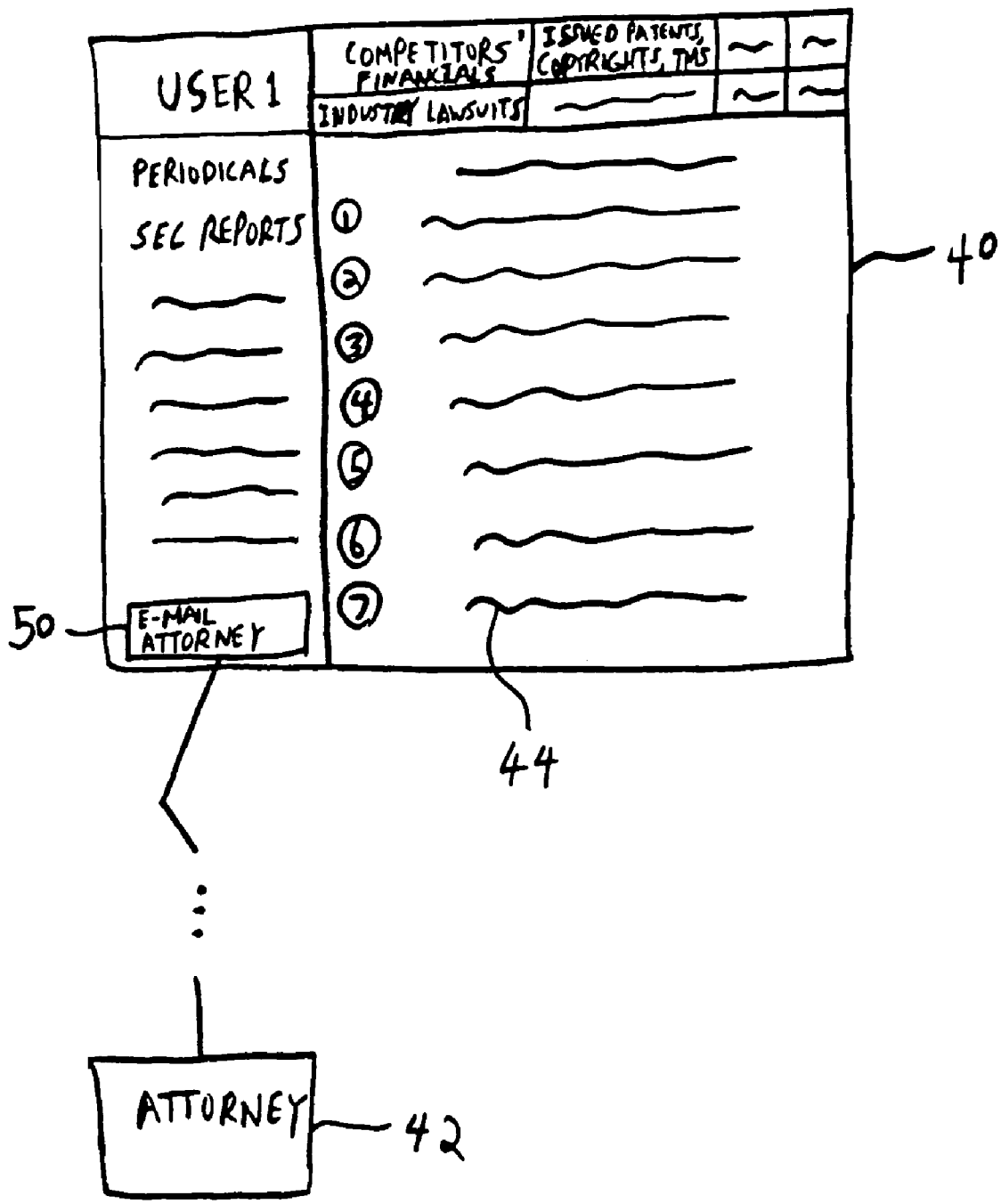
FIG. 4 shows an embodiment of a customized user interface provided by the interactive library system of FIG. 1.

Each user of the library system 10 may request that she be provided with a customized user interface. FIG. 4 shows an embodiment of a customized user interface 40 for User 1 (User 1's computer is reference numeral 11 in FIG. 1). The customized user interface 40 is developed based on information provided by the user 11. The customized user interface data may be stored in the first storage unit 31, or it may be stored in the user's computer 11 from which the library system 10 will access the data to provide the customized user interface. The user interface 40 may be developed using templates or other means known to those skilled in the art to provide flexibility and expeditious configurability. Along the left-hand side and the top of the user interface 40, there are shown types of information desired by this user—such as "Periodicals," "SEC Reports," "Competitors' Financials," "Industry Lawsuits," and "Issued Patents, Copyrights, and Trademarks"—as selectable words or buttons. The user interface 40 is designed so that these selectable words or buttons are accessible by the user via an input device, such as the PC "mouse."

There is displayed a numerical list 44 of results of a search request received from content providers 20, 22. For example, this may be a list of patents, copyrights and trademarks issued to competitors within the last week. If the user desires to see an updated list of industry lawsuits, then she uses an input device to select "Industry Lawsuits." The library system 10 will perform steps 110–116 of FIG. 2 to provide an updated list of lawsuits on the display screen.

The user interface 40 also includes a selectable button 50 for electronically communicating with a contactee preselected by the user. In the exemplary drawing of FIG. 4, the electronic communication means is by e-mail and the preselected contactee is an attorney 42. As an example, if the user 11 is reviewing the list of patents, copyrights and trademarks issued to competitors and discovers that one of the issued patents relates to her company's products, then she may want to immediately contact her company's patent counsel 42 for advice. She can contact the patent attorney 42 by choosing the selectable button 50 with the appropriate input device. This will automatically run the e-mail application, by which the desired message can be sent over an appropriate local area network, wide area network, or other connection means as described above with respect to FIG. 1.

It should be apparent to one skilled in the art that the configuration of the user interface in FIG. 4 is merely one of many possibilities. The types of information desired by a user may be placed anywhere on the display screen and in any order desired. Also, although a numerical list of relevant information is illustrated in FIG. 4, the relevant information may be displayed in any suitable format.

Figure 5:
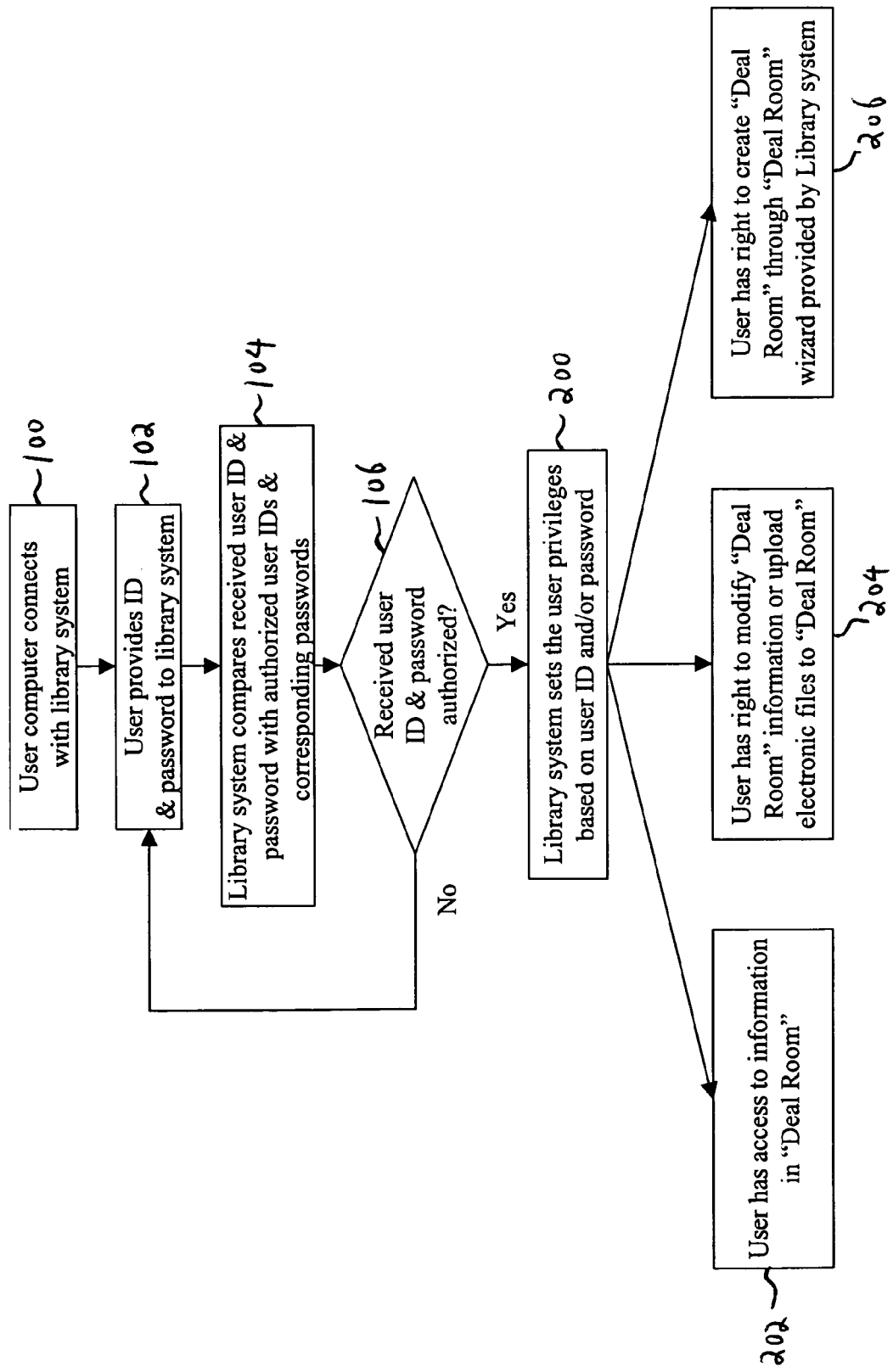
FIG. 5 shows a flowchart of another operation of the interactive library system of FIG. 1.

FIG. 5 is a flowchart of another operation of the interactive library system 10 of FIG. 1. Steps 100–106 are as set forth in connection with description of FIG. 2. Thus, a user computer 11–14 establishes a telecommunication link with the library system 10 (step 100). The user will then be prompted to provide a user identification and password (step 102). User ID and password may be input by the user through a keyboard, voice recognition system or other known input means, or the user ID and password may be stored in memory of the user computer 11–14 and provided to the library system 10. At step 104, the library system 10, preferably the microprocessor of the library computer 30, compares the received user ID and password with authorized user IDs and corresponding passwords stored in the first storage unit 31. If the received user ID and password are found to be authorized, then the user is allowed access into the library system 10; otherwise, the user is prompted to provide another user ID and password (step 106).

When the library system 10 determines that the user is authorized, the system 10 sets the user's privileges based on the user ID and/or password (step 200). Each authorized user's level of access is preferably stored in the first storage unit 31. For a user with one preselected level of access, she may have the right to review and/or download information in a "Deal Room." This is indicated by reference numeral 202. As used herein, "Deal Room" refers to a unique subject matter, all information relating to which may be accessible preferably through one user interface screen (or related user interface screens). See FIG. 6.

For example, the subject matter of one Deal Room may be a patent license agreement. The Deal Room in this case may include a copy of the patent to be licensed, a draft patent license agreement, and news relating competitors of the licensee. Another Deal Room may pertain to a deal to finance a building project in a foreign country. In this case, the Deal Room may include information about the foreign country's laws and regulations pertaining to the project, draft agreement of the project finance deal, and contact information of all people and institutions relevant to the project.

A user with another preselected level of access may have the right to modify information in a Deal Room and/or upload electronic files to a Deal Room (preferably in addition to the right to access information in the Deal Room 202). This is indicated by reference numeral 204. Returning to the patent license agreement Deal Room example above, let's assume that user 1 in FIG. 1 is a patent attorney for the patent licensor and that he has the right to modify and upload electronic files to the Deal Room. He can draft the initial patent license agreement and upload it to the Deal Room. The licensee's patent attorney, who also has the right to modify and upload electronic files to the Deal Room, can review the initial draft agreement and modify it. He can upload this modified draft agreement to the Deal Room.

A user with still another preselected level of access may have the right to create a "Deal Room" using a "Deal Room" wizard (software application program) provided by the library system 10. This is indicated by reference numeral 206. The "Deal Room" wizard, which may be part of the program 34 or another software program stored in memory of the computer 30, requests user input to preselected questions. Based on the user entries and preferably utilizing templates, the "Deal Room" wizard program creates a Deal Room (such as shown in FIG. 6). It should be understood that the three preselected levels of access described in connection with FIG. 5 are exemplary only. There may be more or less as desired. Also, it should be understood that the three rights 202, 204, 206 described in connection with FIG. 5 are exemplary only. There may be more or less as desired.

FIG. 6 shows a sample Deal Room screen 230 created using the "Deal Room" wizard for the patent license agreement example described above. This sample Deal Room screen is created for Microsoft's Windows-based operating system. However, the sample Deal Room screen may be created for any other operating system. The sample Deal Room screen 230 includes a patent folder 232, a license agreement folder 234, a competitor news folder 236 and a contact information folder 238. Although not shown, each folder may include sub-folders. By selecting a folder, an authorized user can see what content the folder contains on the main screen portion 240. For example, by selecting the license agreement folder 234, the user can see what license agreement, if any, the folder contains.

The appearance of the sample Deal Room screen 230 is for exemplary purposes only. The organization and presentation of the screen may be varied, as known to those of ordinary skill in the art, without deviating from the scope and spirit of the invention.

A user may be charged a fee for use of the library system 10 of the present invention. While not to be construed as exhaustive, the following methods (alone or some combination thereof are contemplated: First, a user may be billed based on the time amount of access to the library system 10. The time amount of access data for users are preferably stored in the first storage unit 31. After a preselected time period, such as one month, an account statement for the user will be generated.

Second, a user may be billed based on the time amount of access to each content provider. The time amount of access to each content provider data for users are preferably stored in the first storage unit 31. After a preselected time period, such as one month, an account statement for the user will be generated.

Third, a user may be billed based on the time amount of access to commercial content providers. The time amount of access to commercial content providers data for users are preferably stored in the first storage unit 31. After a preselected time period, such as one month, an account statement for the user will be generated.

Fourth, a user may be billed based on the number of search queries transmitted by the library system 10 to the content providers. The number of transmitted search queries data for users are preferably stored in the first storage unit 31. After a preselected time period, such as one month, an account statement for the user will be generated.

Finally, a user may be billed directly by the content providers accessed by the user through the library system 10. How to bill the user will be determined by each content provider accessed. For example, the user may be billed based on the time amount of access to the content provider or the number of search queries transmitted to the content provider. The content providers will access the user information stored in the first storage unit 31 of the library system 10 to generate an account statement.

Those skilled in the art will recognize that the method and apparatus of the present invention has many applications, and that the present invention is not limited to the representative examples disclosed herein. Moreover, the scope of the present invention covers conventionally known variations and modifications to the methods and system components described herein, as would be known by those skilled in the art.

What is claimed is:

1. In an interactive library system having a computer in telecommunication link with at least one user computer and computer of at least one content provider requiring payment for information access, a method which comprises:

receiving, by the library system computer, user identification and password from the user computer;

comparing, by the library system computer, said received user identification and password with authorized user identifications and corresponding passwords stored in the library system to determine whether to grant access to the interactive library system;

if comparison results in grant of access, then library system is capable of performing one or both of the following:

(1) receiving, by the library system computer, input from the user computer specifying type of information desired by the user;

establishing, by the library system computer, telecommunication link with content provider computer;

transmitting, by the library system computer, said type of information desired by the user as a search request to the content provider computer;

receiving, by the library system computer, result of said search request from the content provider computer; and providing, by the library system computer, said result to the user computer;

(2) setting, by the library system computer, the user's privileges;

if the user's privileges correspond to a first preselected level of access, then providing, by the library system computer, access to information in a Deal Room; and if the user's privileges correspond to a second preselected level of access, then providing, by the library system computer, right to modify Deal Room information and/or upload electronic files to the Deal Room.

2. The method of claim 1, further comprising:

customizing a user interface provided by the interactive library system to the user computer based on type of information desired by the user.

3. The method of claim 1, further comprising:

providing a user interface, by the interactive library system to the user computer, that includes an interactive element, the selection of said element by the user activating a communication program to enable communication with a pre-selected contactee.

4. The method of claim 1, further comprising:

if the user's privileges correspond to a third preselected level of access, then providing, by the library system computer, right to create a Deal Room.

5. The method of claim 4, wherein the creation of the Deal Room is through a software application program provided by the library system computer.

6. The method of claim 1, further comprising:

determining, by the library system computer, time amount of access to the interactive library system by the user computer; and storing, by the library system, the time amount of access to the interactive library system by the user computer.

7. The method of claim 6, further comprising:

generating an account statement after a preselected period of time based on the time amount of access for the user computer stored in the library system.

8. The method of claim 1, further comprising:

determining, by the library system computer, time amount of access by the user computer to each content provider; and storing, by the library system, the time amount of access by the user computer to each content provider.

9. The method of claim 8, further comprising:

generating an account statement after a preselected period of time based on the time amount of access by the user computer to each content provider stored in the library system.

10. The method of claim 1, further comprising:

determining, by the library system computer, time amount of access by the user computer via the library system computer to each content provider requiring payment for information access; and storing, by the library system, the time amount of access by the user computer to each content provider requiring payment for information access.

11. The method of claim 10, further comprising:

generating an account statement after a preselected period of time based on the time amount of access by the user computer to each content provider requiring payment for information access stored in the library system.

12. The method of claim 1, further comprising:

determining, by the library system computer, number of the search requests transmitted to the content providers for the user computer; and storing, by the library system, the number of search requests transmitted for the user computer.

13. The method of claim 12, further comprising:

generating an account statement after a preselected period of time based on the number of search requests for the user computer stored in the library system.

14. The method of claim 1, further comprising:

accessing, by the content providers accessed by the user computer through the library system, preselected user information stored in the library system; and generating an account statement, by the content providers accessed by the user computer, after a preselected time period based on the preselected user information stored in the library system.

15. The method of claim 1, further comprising:

receiving, by the library system computer, input from the user computer specifying a preselected time interval for transmitting search request to the content provider.

16. The method of claim 1, further comprising:

notifying, by the library system computer, the user computer that the result of the search request is ready for review by the user.

17. The method of claim 16, wherein the notification is by electronic communication.

18. An interactive library system providing telecommunication links with at least one user computer and computer of at least one content provider requiring payment for information access, which comprises:

a library computer adapted to receive and transmit data over telecommunication links, the library computer having a microprocessor and a first storage unit;

a second storage unit electrically coupled to the library computer to store user identifications, corresponding passwords and levels of access;

a third storage unit electrically coupled to said library computer to store information relating to a Deal Room;

a program, operable on the microprocessor, stored in the first storage unit, the program comparing user identification and password received from the user computer with the user identifications and corresponding passwords stored in the second storage unit to determine whether the user is authorized; and the program, if the user computer is determined to be authorized, causing one or both of the following: (i) the library computer to communicate with the content provider computer to transmit type of information desired by the user as a search request and to receive result of the search request; (ii) setting the user computer's privileges such that if the user computer's privileges correspond to a first preselected level of access, then causing the library system computer to provide access to information in the Deal Room, and if the user computer's privileges correspond to a second preselected level of access, then causing the library system computer to provide right to modify Deal Room information and/or upload electronic files to the Deal Room.

19. The interactive library system of claim 18, which further comprises:

a fourth storage unit electrically coupled to the library computer to store user-specific data.

20. The interactive library system of claim 19, wherein said user-specific data includes customized user interface data.

21. The interactive library system of claim 19, wherein the user-specific data includes user account data.

22. The interactive system of claim 21, wherein the user account data includes time amount of access by the user computer to the library computer.

23. The library system of claim 21, wherein the user data includes time amount of access by the user computer via the library computer to the computer of each content provider requiring payment for information access.

24. The interactive library system of claim 19, wherein the second and fourth storage units are the same.

* * * * *